US012720611B2

(12) United States Patent
Sen et al.

(10) Patent No.: US 12,720,611 B2
(45) Date of Patent: Aug. 25, 2026

(54) POWER AND RESOURCE ALLOCATION FOR NON-ORTHOGONAL MULTIPLE ACCESS (NOMA)

(71) Applicant: QUALCOMM Incorporated, San Diego, CA (US)

(72) Inventors: Pinar Sen, San Diego, CA (US); Yongjun Kwak, San Diego, CA (US); Hwan Joon Kwon, San Diego, CA (US); Jing Jiang, San Diego, CA (US)

( * ) Notice: Subject to any disclaimer, the term of this patent is extended or adjusted under 35 U.S.C. 154(b) by 878 days.

(21) Appl. No.: 17/934,809

(22) Filed: Sep. 23, 2022

(65) Prior Publication Data

US 2024/0107591 A1 Mar. 28, 2024

(51) Int. Cl.
*H04W 74/08* (2024.01)
*H04W 74/0833* (2024.01)

(52) U.S. Cl.
CPC ... *H04W 74/0841* (2013.01); *H04W 74/0866* (2013.01)

(58) Field of Classification Search
CPC ......... H04W 74/0841; H04W 74/0866; H04W 74/0836; H04W 52/325; H04W 52/50; H04W 74/006; H04W 52/146; H04W 52/34
See application file for complete search history.

(56) References Cited

U.S. PATENT DOCUMENTS 7,526,307 B1 * 4/2009 Mecklenbraeuker ........................ H04W 74/0833 455/450
8,811,325 B2 * 8/2014 Tang .................. H04W 52/146 370/329
10,785,796 B2 * 9/2020 Bertrand ........... H04W 74/0833
11,611,998 B2 * 3/2023 Agiwal ............. H04W 74/0833
2006/0018289 A1 * 1/2006 Schulist ................ H04W 52/50 370/335
2011/0280210 A1 * 11/2011 Zhang .................. H04W 52/50 370/329
2018/0324716 A1 * 11/2018 Jeon ...................... H04W 52/50
2018/0324853 A1 * 11/2018 Jeon .................... H04W 52/242

(Continued)

OTHER PUBLICATIONS

International Search Report and Written Opinion—PCT/US2023/073100—ISA/EPO—Jan. 24, 2024.

(Continued)

*Primary Examiner* — Wutchung Chu

(57) ABSTRACT

This disclosure provides systems, methods, and devices for wireless communication that support power allocation or resource allocation for non-orthogonal multiple access (NOMA). In a first aspect, a method of wireless communication includes a user equipment (UE) randomly selecting a parameter value associated with a power level of multiple power target levels, and transmitting, to a network entity and using the power level, an uplink communication. In a second aspect, a method of wireless communication includes a UE receiving, from a network entity, an indicator that indicates multiple resource candidates, each resource candidate of the multiple resource candidates overlaps with at least one other resource candidate of the multiple resource candidates, and transmitting, to the network entity and using a resource candidate of the multiple resource candidates, an uplink communication. Other aspects and features are also claimed and described.

13 Claims, 8 Drawing Sheets

(56) References Cited

U.S. PATENT DOCUMENTS

| | | | | |
|---|---|---|---|---|
| 2019/0281634 | A1* | 9/2019 | Takahashi | H04W 74/006 |
| 2020/0107373 | A1 | 4/2020 | Roy et al. | |
| 2020/0396698 | A1* | 12/2020 | Bala | H04L 5/0005 |
| 2021/0068161 | A1* | 3/2021 | Takahashi | H04B 17/327 |
| 2021/0144742 | A1* | 5/2021 | Jeon | H04W 74/0833 |
| 2021/0266980 | A1* | 8/2021 | Kim | H04W 74/04 |
| 2022/0030607 | A1* | 1/2022 | Liu | H04L 5/0094 |
| 2022/0078856 | A1* | 3/2022 | Jeon | H04W 74/0833 |
| 2022/0183076 | A1 | 6/2022 | Lee et al. | |
| 2022/0191945 | A1* | 6/2022 | Yamamoto | H04W 52/50 |
| 2023/0094601 | A1* | 3/2023 | Xu | H04L 5/0094 370/318 |
| 2023/0284279 | A1* | 9/2023 | Zhou | H04W 72/04 370/328 |
| 2024/0107591 | A1* | 3/2024 | Sen | H04W 74/0866 |

OTHER PUBLICATIONS

Partial International Search Report—PCT/US2023/073100—ISA/EPO—Dec. 1, 2023.

International Search Report and Written Opinion—PCT/US2023/073100—ISA/EPO—Mar. 27, 2024.

Panasonic: "Discussion on URLLC Enhancements for Grant-free Transmission", 3GPP TSG RAN WG1 #96, R1-1902396, 3rd Generation Partnership Project, Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 15, 2019, 8 Pages, XP051600092, Sections 1, 2.

* cited by examiner

UE 115
Processor 402
Memory 404
Instructions 405
Grant-free Information 406
Power Levels 408
Resources 410
Mapping Information 412
Transmitter 416
Receiver 418

Base Station 105
Processor 452
Memory 454
Instructions 460
Decode Logic 462
Grant-free Information 464
Power Levels 466
Resources 468
Mapping Information 469
Transmitter 456
Receiver 458

470
Configuration Information

472
Grant-free Message

474
Uplink Message

UE 415

1100
1102
Transmit, to a user equipment (UE), an uplink communication transmitted using a power level of multiple power target levels, the power level is based on a parameter value that is randomly selected by the UE
1104
Receive, from the UE and based on a resource candidate of the multiple resource candidates determined by the UE, an uplink communication

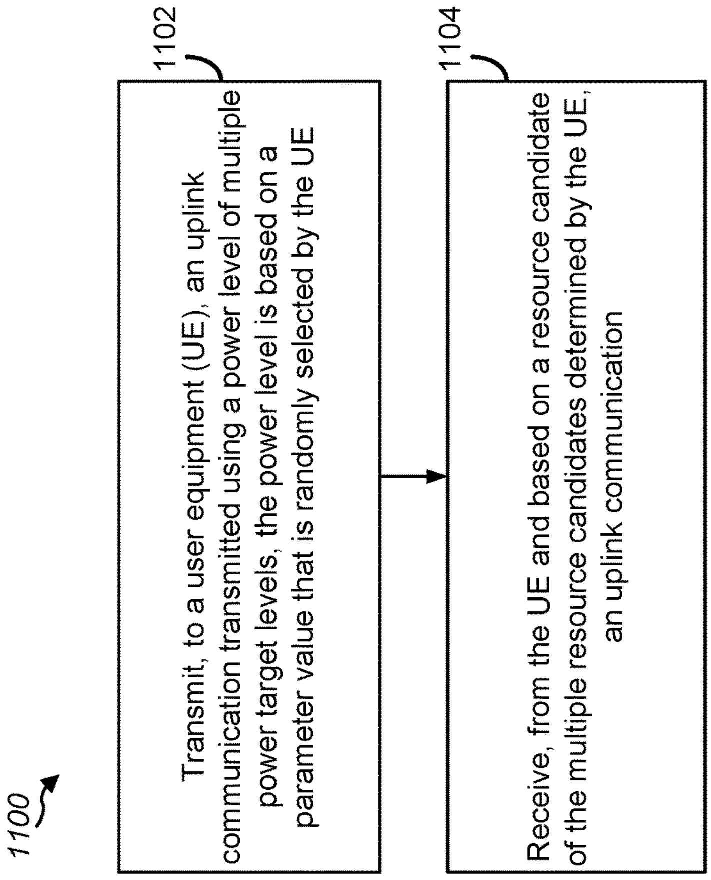

FIGURE 11
240
Controller
242
Memory
Grant-free Information 1202
Decode Logic 1203
Wireless Radios
1201a-t
234a-t
Base Station 1200

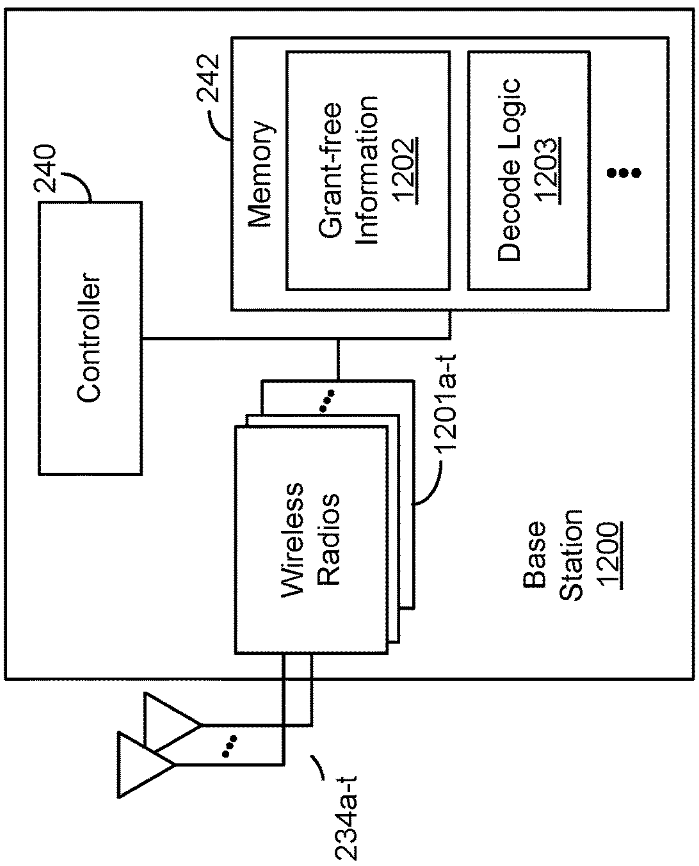

FIGURE 12

POWER AND RESOURCE ALLOCATION FOR NON-ORTHOGONAL MULTIPLE ACCESS (NOMA)

TECHNICAL FIELD

Aspects of the present disclosure relate generally to wireless communication systems, and more particularly, to power and resource allocation for non-orthogonal multiple access (NOMA), such as power allocation or resource element allocation for grant-free communication. Some features may enable and provide improved communications, including increased multiplexing gain and uplink cell capacity, reduced control overhead, efficient resource utilization, grant-free uplink communication, or a combination thereof.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

In environments with high connectivity, such as a home network or an Internet-of-Things (IoT) applications, a network may need to support a large connection density, small packet size(s), bursty traffic which may have a large inter-arrival time, or a combination thereof. Such networks that are configured to operate according to uplink grants for uplink communication may suffer from reduced multiplexing gain and uplink cell capacity, increased control overhead, poor resource utilization, or a combination thereof.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication by a user equipment (UE) includes randomly selecting a parameter value associated with a power level of multiple power target levels. The method further includes transmitting, to a network entity and using the power level, an uplink communication.

In some implementations, the method further includes receiving, from the network entity, a configuration that includes or indicates the multiple power target levels, and wherein the parameter value is the power level selected from the multiple power target level.

In some other implementations of the method, the parameter value is a physical random access channel (PRACH) preamble. In some such implementations, the method includes determining the power level based on the PRACH preamble and based on mapping data that maps PRACH preambles to power target levels.

In an additional aspect of the disclosure, an apparatus configured for wireless communication is disclosed. The apparatus includes at least one processor, and a memory coupled to the at least one processor. The at least one processor is configured to randomly select a parameter value associated with a power level of multiple power target levels. The at least one processor is further configured to initiate transmission of, to a network entity and using the power level, an uplink communication.

In an additional aspect of the disclosure, an apparatus configured for wireless communication is disclosed. The apparatus includes means for randomly selecting a parameter value associated with a power level of multiple power target levels. The apparatus further includes means for transmitting, to a network entity and using the power level, an uplink communication.

In an additional aspect of the disclosure, a non-transitory computer-readable medium stores instructions that, when executed by a processor, cause the processor to perform operations including randomly selecting a parameter value associated with a power level of multiple power target levels. The operations further include transmitting, to a network entity and using the power level, an uplink communication.

In an additional aspect of the disclosure, a method of wireless communication by a UE includes receiving, from a network entity, an indicator that indicates multiple resource candidates. Each resource candidate of the multiple resource candidates overlaps with at least one other resource candidate of the multiple resource candidates. The method further includes transmitting, to the network entity and based on a resource candidate of the multiple resource candidates, an uplink communication.

In an additional aspect of the disclosure, an apparatus configured for wireless communication is disclosed. The apparatus includes at least one processor, and a memory coupled to the at least one processor. The at least one processor is configured to receive, from a network entity, an indicator that indicates multiple resource candidates. Each resource candidate of the multiple resource candidates overlaps with at least one other resource candidate of the multiple resource candidates. The at least one processor is further configured to initiate transmission of, to the network entity and based on a resource candidate of the multiple resource candidates, an uplink communication.

In an additional aspect of the disclosure, an apparatus configured for wireless communication is disclosed. The apparatus includes means for receiving, from a network entity, an indicator that indicates multiple resource candidates. Each resource candidate of the multiple resource candidates overlaps with at least one other resource candidate of the multiple resource candidates. The apparatus further includes means for transmitting, to the network entity and based on a resource candidate of the multiple resource candidates, an uplink communication.

In an additional aspect of the disclosure, a non-transitory computer-readable medium stores instructions that, when executed by a processor, cause the processor to perform operations including receiving, from a network entity, an indicator that indicates multiple resource candidates. Each resource candidate of the multiple resource candidates overlaps with at least one other resource candidate of the multiple resource candidates. The operations further include transmitting, to the network entity and based on a resource candidate of the multiple resource candidates, an uplink communication.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 11 is a flow diagram illustrating an example process that supports power allocation or resource allocation for NOMA A according to one or more aspects.

FIG. 12 is a block diagram of an example base station that supports power allocation or resource allocation for NOMA according to one or more aspects.

Like reference numbers and designations in the various drawings indicate like elements.

DETAILED DESCRIPTION

Figure 1:
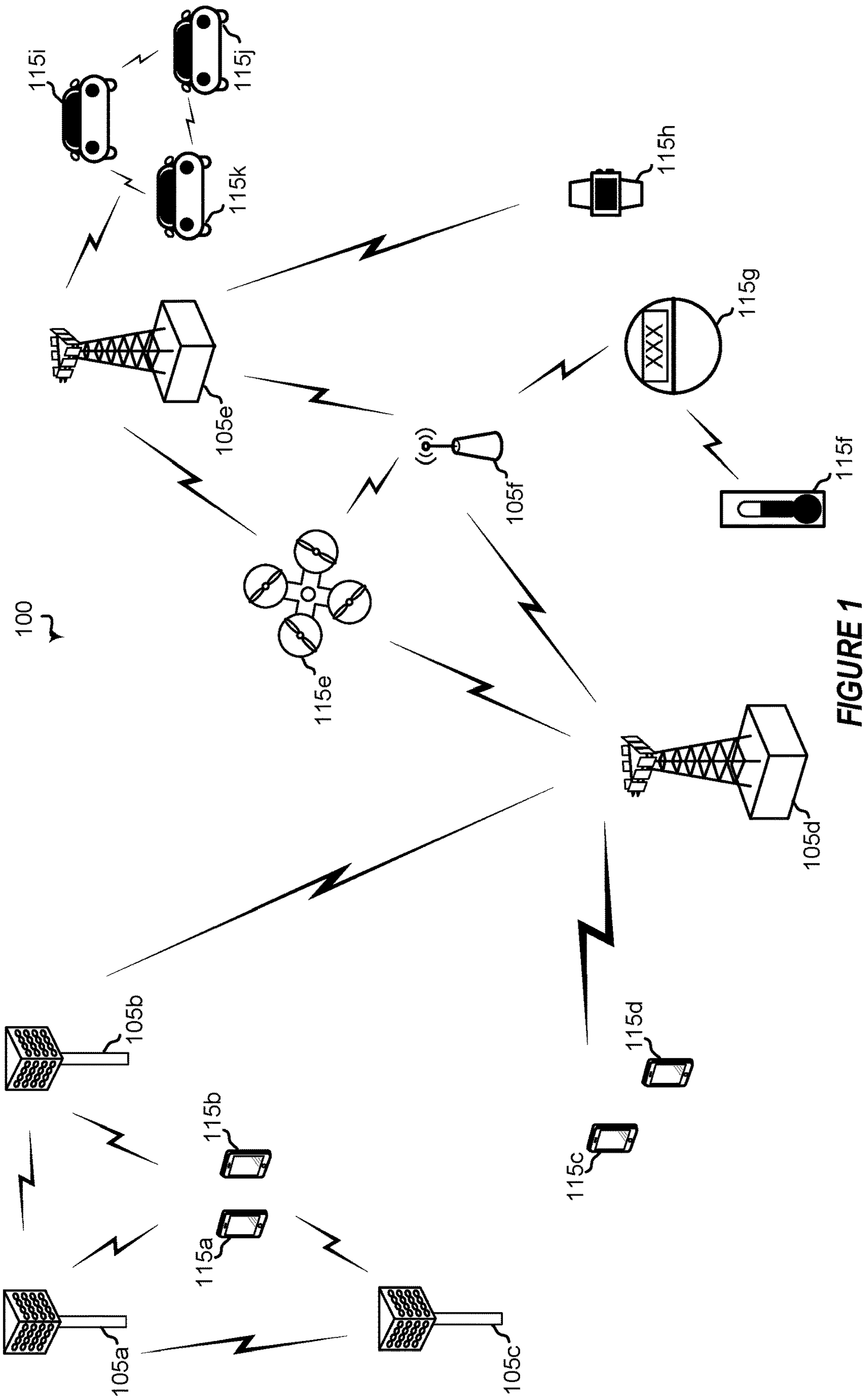
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support power allocation or resource allocation for non-orthogonal multiple access (NOMA). For example, in a first aspect, the present disclosure enables power allocation for one or more user equipments (UEs). To illustrate, a UE may randomly select a parameter value associated with a power level of multiple power target levels, and transmit, using the power level, an uplink communication to a network entity. In some implementations, the UE may receive a configuration that includes or indicates the multiple power target levels and the parameter value is the power level selected from the multiple power target levels. In other implementations, the UE may receive mapping data that maps physical random access channel (PRACH) preambles to the multiple power target levels. In such implementations, the parameter value may be a PRACH preamble and the UE may determine using the mapping data and based on the power level based on the PRACH preamble. In a second aspect, the present disclosure enables resource allocation for one or more UEs. To illustrate, a UE may receive an indicator that indicates multiple resource candidates, and transmit, based on a resource candidate of the multiple resource candidates, an uplink communication to a network entity. The multiple resource candidates may include multiple frequency domain resource candidates or multiple time domain resource candidates. In some implementations, at least one resource candidate of the multiple resource candidates overlaps with at least one other resource candidate of the multiple resource candidates. In some other implementations, each resource candidate of the multiple resource candidates overlaps with at least one other resource candidate of the multiple resource candidates, or overlaps with each other resource candidate of the multiple resource candidates. The UE may select the resource candidate from the multiple resource candidates based on a demodulation reference signal (DMRS) port of the UE or based on a PRACH preamble. In some implementations, the indicator that indicates the multiple resource candidates includes or indicates mapping data that maps DMRS ports to the multiple resource candidates, or that maps PRACH preambles to the multiple resource candidates. Additionally, the uplink communication may indicate the DMRS port or the PRACH preamble to enable the network entity to determine or identify the resource candidate.

Particular implementations of the subject matter described in this disclosure may be implemented to realize one or more of the following potential advantages or benefits. In some aspects, the present disclosure provides techniques for creating or having a grant-free situation in a multiple access environment where a base station or other network entity receives communications in which the communications have asymmetric Signal-to-Interference-plus-Noise Ratio (SINR). The asymmetric SINR may enable the base station or the network entity to perform successive interference cancellation with respect to multiple received communications. In some other aspects, the present disclosure may enable and provide improved communications, including increased multiplexing gain and uplink cell capacity, reduced control overhead, efficient resource utilization, grant-free uplink communication, or a combination thereof. For example, in NOMA, a UE performing a grant-free transmission may transmit as soon as it has a packet without going through control signaling. Additionally, the grant-free operation and multiple access enable efficient resource utilization.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), $6^{th}$ Generation (6G) networks, as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, 5G NR, or 6G technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a “sub-6 GHz” band in various documents and articles. A similar nomenclature issue sometimes occurs with regard to FR2, which is often referred to (interchangeably) as a “millimeter wave” (mmWave) band in documents and articles, despite being different from the extremely high frequency (EHF) band (30 GHz-300 GHz) which is identified by the International Telecommunications Union (ITU) as a “mmWave” band.

With the above aspects in mind, unless specifically stated otherwise, it should be understood that the term “sub-6 GHz” or the like if used herein may broadly represent frequencies that may be less than 6 GHz, may be within FR1, or may include mid-band frequencies. Further, unless specifically stated otherwise, it should be understood that the term “mmWave” or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations **105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f*** is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs **115*a*-115*d* of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115*e*-115*k* illustrated in FIG. 1 are examples of various machines configured for communication that access wireless network 100**.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105*a*-105*c* serve UEs 115*a* and 115*b* using 3D beamforming and coordinated spatial techniques, such as coordinated multipoint (CoMP) or multi-connectivity. Macro base station 105*d* performs backhaul communications with base stations 105*a*-105*c*, as well as small cell, base station 105*f*. Macro base station 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through wireless network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. Wireless network 100 may also provide additional network efficiency through dynamic, low-latency TDD communications or low-latency FDD communications, such as in a vehicle-to-vehicle (V2V) mesh network between UEs 115*i*-115*k* communicating with macro base station 105*e*.

Figure 2:
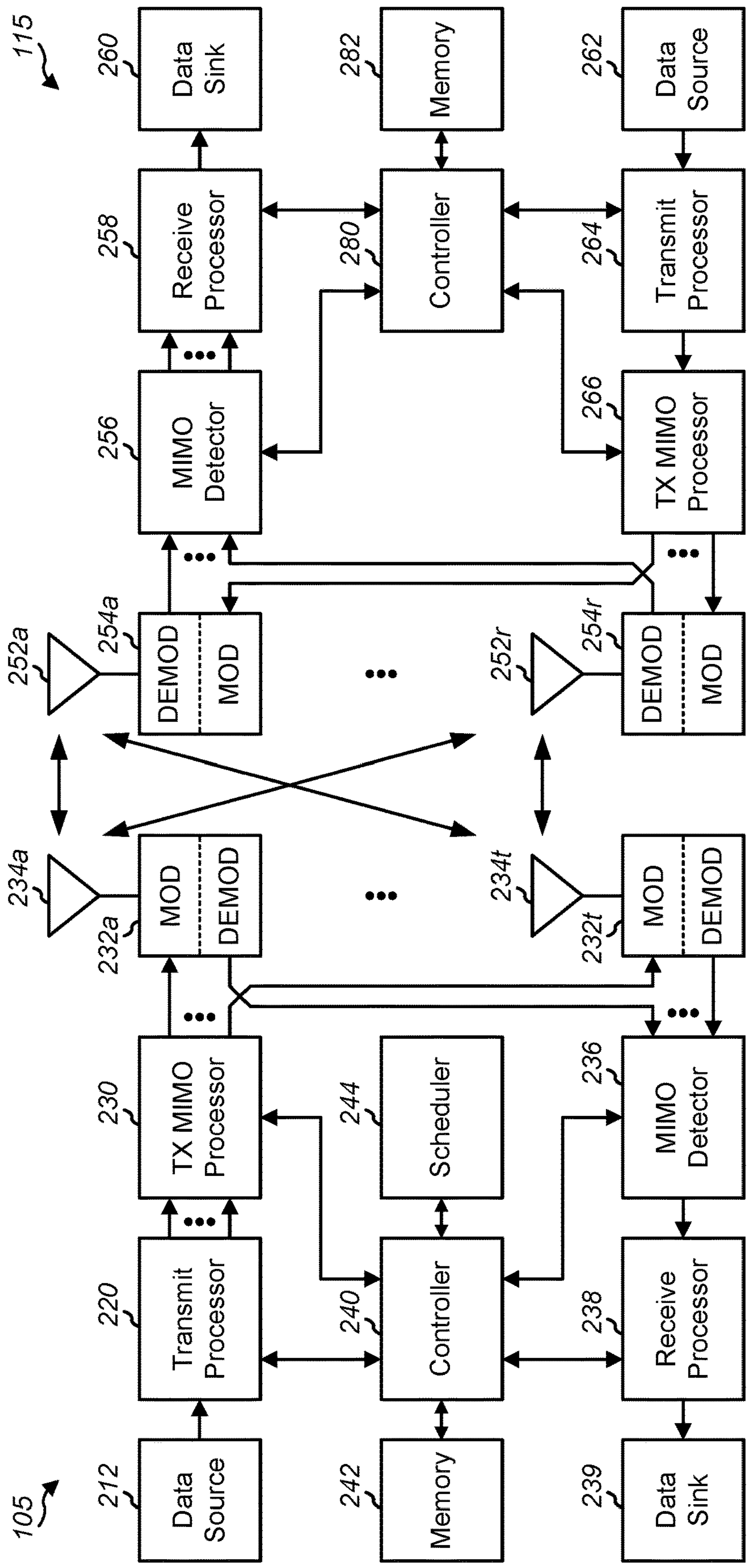
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105*f* in FIG. 1, and UE 115 may be UE 115*c* or 115*d* operating in a service area of base station 105*f*, which in order to access small cell base station 105*f*, would be included in a list of accessible UEs for small cell base station 105*f*. Base station 105 may also be a base station of some other type. As shown in FIG. 2, base station 105 may be equipped with antennas 234*a* through 234*t*, and UE 115 may be equipped with antennas 252*a* through 252*r* for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232*a* through 232*t*. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232*a* through 232*t* may be transmitted via antennas 234*a* through 234*t*, respectively.

At UE 115, antennas 252*a* through 252*r* may receive the downlink signals from base station 105 and may provide received signals to demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254*a* through 254*r*, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254*a* through 254*r* (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIG. 7, 8, 10, or 11, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3:
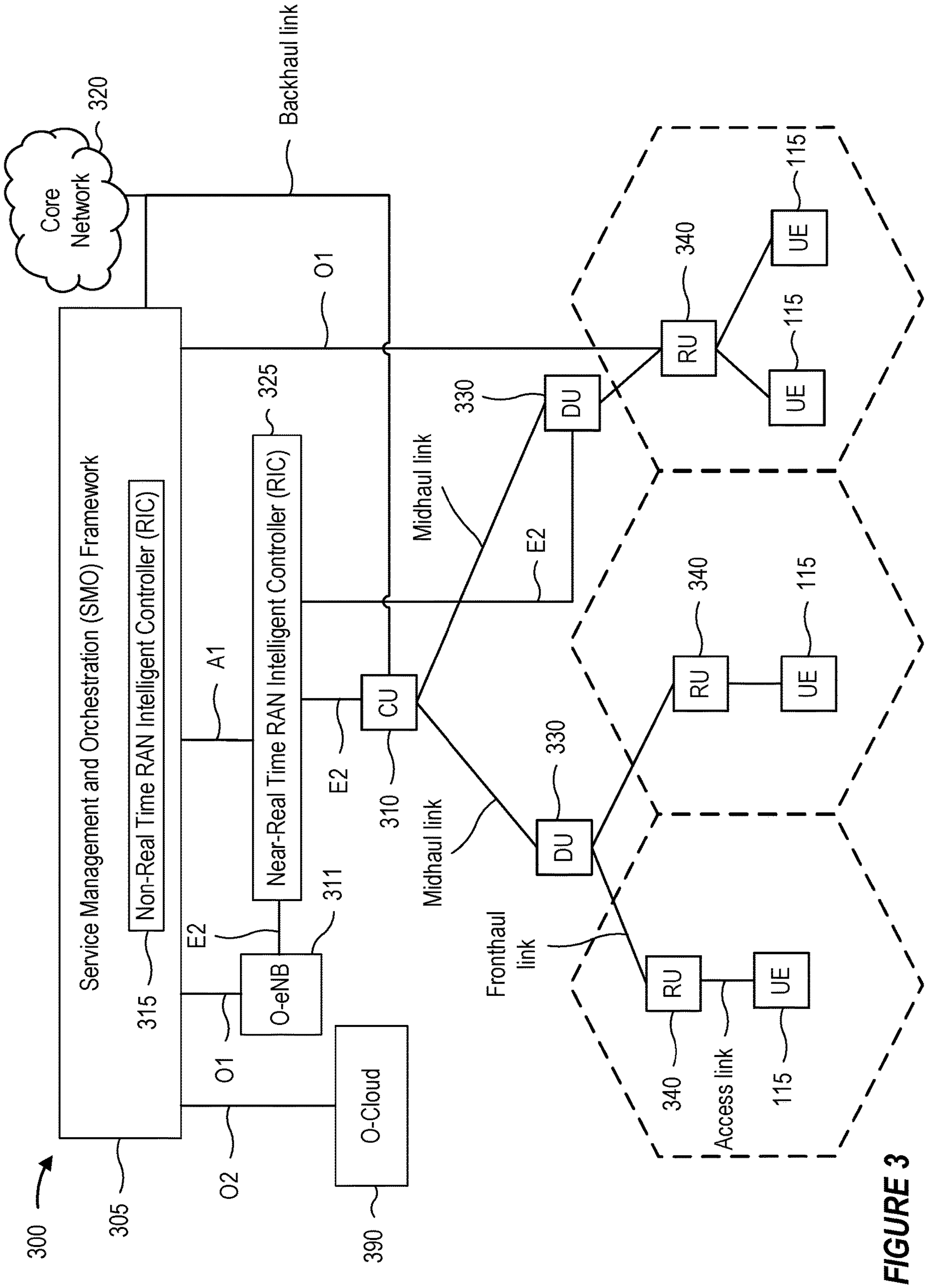
FIG. 3 shows a diagram illustrating an example disaggregated base station architecture according to one or more aspects.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 115 via one or more radio frequency (RF) access links. In some implementations, the UE 115 may be simultaneously served by multiple RUs 340.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 115. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an AI interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via 01) or via creation of RAN management policies (such as AI policies).

As described herein, a node (which may be referred to as a node, a network node, a network entity, or a wireless node) may include, be, or be included in (e.g., be a component of) a base station (e.g., any base station described herein), a transmission and reception point (TRP), a UE (e.g., any UE described herein), a network controller, an apparatus, a device, a computing system, an integrated access and backhauling (IAB) node, a distributed unit (DU), a central unit (CU), a remote unit (RU), a core network, a LFM, and/or a another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a second one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Figure 4:
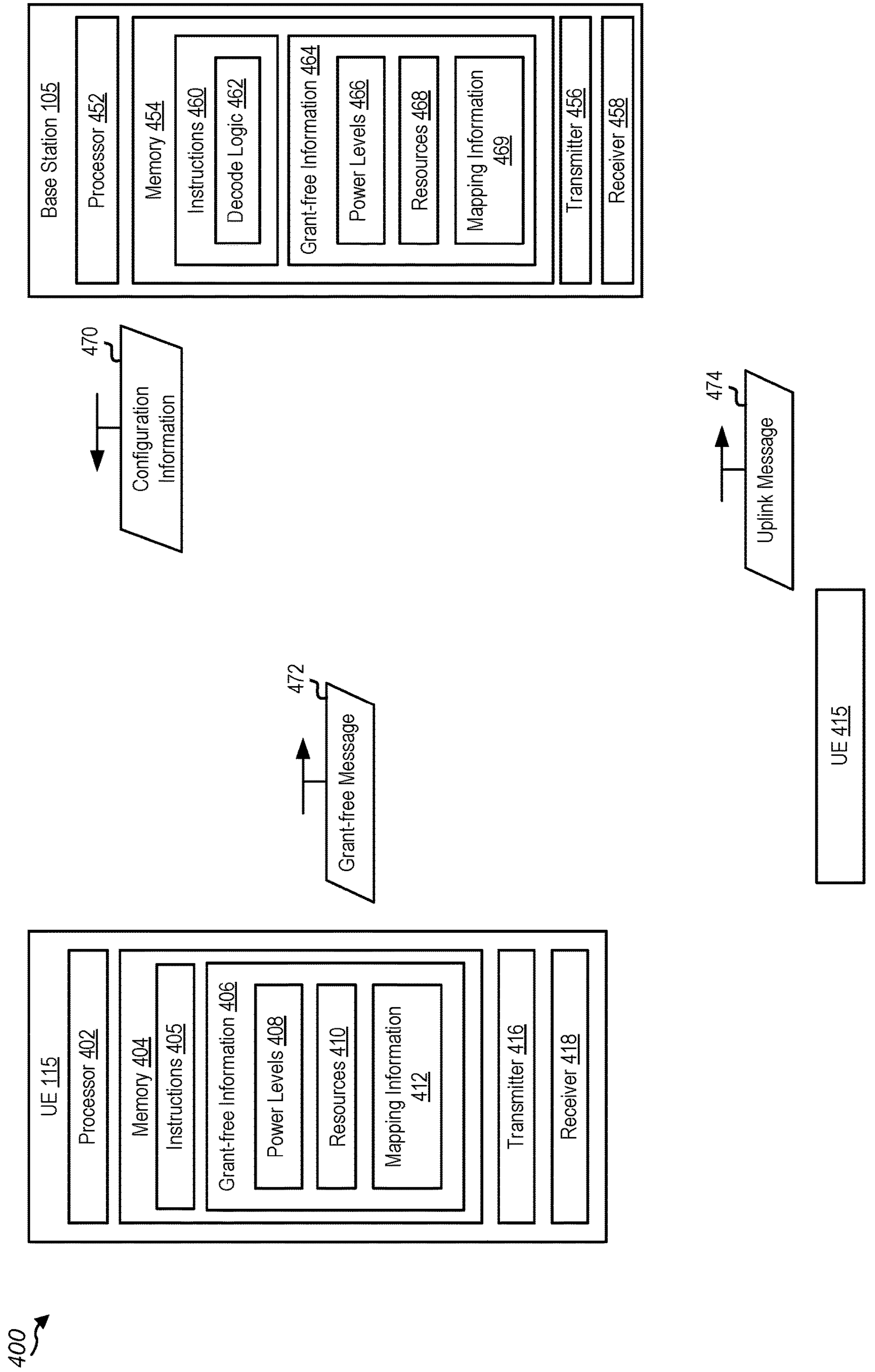
FIG. 4 is a block diagram illustrating an example wireless communication system that supports power allocation or resource allocation for non-orthogonal multiple access (NOMA) according to one or more aspects.

FIG. 4 is a block diagram of an example wireless communications system 400 that supports power allocation or resource allocation for NOMA according to one or more aspects. In some examples, wireless communications system 400 may implement aspects of wireless network 100. Wireless communications system 400 includes UE 115, a UE 415, and base station 105. Although two UEs (115 and 415) and one base station 105 are illustrated, in some other implementations, wireless communications system 400 may generally include a single UE or more than two UEs 115, and may include more than one base station 105.

UE 115 may include a variety of components (such as structural, hardware components) used for carrying out one or more functions described herein. For example, these components may include one or more processors 402 (hereinafter referred to collectively as "processor 402"), one or more memory devices 404 (hereinafter referred to collectively as "memory 404"), one or more transmitters 416 (hereinafter referred to collectively as "transmitter 416"), and one or more receivers 418 (hereinafter referred to collectively as "receiver 418"). In some implementations, UE 115 may include an interface (e.g., a communication interface) that includes transmitter 416, receiver 418, or a combination thereof. Processor 402 may be configured to execute instructions 405 stored in memory 404 to perform the operations described herein. In some implementations, processor 402 includes or corresponds to one or more of receive processor 258, transmit processor 264, and controller 280, and memory 404 includes or corresponds to memory 282.

Memory 404 includes or is configured to store instructions 405 and grant-free information 406. Grant-free information 406 may enable UE 115 to perform one or more grant-free operations, such as transmission of a grant-free message. In some implementations, the grant-free message may include an uplink (UL) messages, one or more messages of a 2-step random access channel (RACH), or a combination thereof.

Grant-free information 406 may include or indicate multiple power levels 408, multiple resources 410, mapping information 412, or a combination thereof. Multiple power levels 408 may include multiple power target levels, such as multiple transmit power target levels. An example of multiple power levels 408 is described further herein at least with reference to FIG. 5. Multiple resources 410 may include multiple frequency domain resource candidates or multiple time domain resource candidates. Each resource candidate of the multiple resource candidates overlaps with at least one other resource candidate of the multiple resource candidates. each resource candidate of the multiple resource candidates overlaps with each other resource candidate of the multiple resource candidates. In some implementations, at least one resource candidate of the multiple resource candidates overlaps with at least one other resource candidate of the multiple resource candidates. In some other implementations, each resource candidate of the multiple resource candidates overlaps with at least one other resource candidate of the multiple resource candidates, or overlaps with each other resource candidate of the multiple resource candidates. An example of multiple resources 410 is described further herein at least with reference to FIG. 6. Mapping information 412 may include mapping data. In some implementations, the mapping data may include or correspond to multiple power levels 408 or multiple resources 410. For example, the mapping data that maps PRACH preambles to the multiple power target levels. As another example, the mapping data that maps DMRS ports to the multiple resource candidates. As another example, the mapping data that maps PRACH preambles to the multiple resource candidates.

Transmitter 416 is configured to transmit reference signals, control information and data to one or more other devices, and receiver 418 is configured to receive references signals, synchronization signals, control information and data from one or more other devices. For example, transmitter 416 may transmit signaling, control information and data to, and receiver 418 may receive signaling, control information and data from, base station 105. In some implementations, transmitter 416 and receiver 418 may be integrated in one or more transceivers. Additionally or alternatively, transmitter 416 or receiver 418 may include or correspond to one or more components of UE 115 described with reference to FIG. 2.

In some implementations, UE 115 may include one or more antenna arrays. The one or more antenna arrays may be coupled to transmitter 416, receiver 418, or a communication interface. The antenna array may include multiple antenna elements configured to perform wireless communications with other devices, such as with the base station 105. In some implementations, the antenna array may be configured to perform wireless communications using different beams, also referred to as antenna beams. The beams may include TX beams and RX beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. Alternatively, one or more sets of antenna elements of the antenna array may be configured to concurrently generate multiple beams, for example using multiple RF chains of the UE 115. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

UE 415 may include one or more components as described herein with reference to UE 115. In some implementations, UE 415 is a 5G-capable UE, a 6G-capable UE, or a combination thereof.

Base station 105 may include a variety of components (such as structural, hardware components) used for carrying out one or more functions described herein. For example, these components may include one or more processors 452 (hereinafter referred to collectively as "processor 452"), one or more memory devices 454 (hereinafter referred to collectively as "memory 454"), one or more transmitters 456 (hereinafter referred to collectively as "transmitter 456"), and one or more receivers 458 (hereinafter referred to collectively as "receiver 458"). In some implementations, base station 105 may include an interface (e.g., a communication interface) that includes transmitter 456, receiver 458, or a combination thereof. Processor 452 may be configured to execute instructions 460 stored in memory 454 to perform the operations described herein. In some implementations, processor 452 includes or corresponds to one or more of receive processor 238, transmit processor 220, and controller 240, and memory 354 includes or corresponds to memory 242.

Memory 454 includes or is configured to store instructions 460 and grant-free information 464. Instructions 460 may include decode logic 462. Decode logic 462 is configured to enable processor 452 to perform one or more decode operations. For example, decode logic 462 may be configured to enable processor 452 to perform successive interference cancellation. To illustrate, in a multiple access environment, base station 105 may received transmissions from two different UEs. Base station 105 may decode a one of the two transmissions first and then cancel the correctly decoded transmission and decode the other of the two transmissions. In this way, the base station 105 (or a decoder thereof) may successively try to decode each transmission (e.g., message or packet) of multiple transmissions and, at each step, cancels a successively decoded packet from a signal (associated with the multiple transmissions). When performing successive interference cancellation, asymmetric SINR between different received transmissions (or between different UEs) may be advantageous in that base station 105 may begin decoding a received transmission having a highest SINR. It is not good to have equal power, you want different power for different time and frequency domain resources.

Grant-free information 464 may include or correspond to grant-free information 406. Grant-free information 464 may include or indicate multiple power levels 466, multiple resources 468, mapping information 469, or a combination thereof. In some implementations, multiple power levels 466 may include or correspond to multiple power levels 408, multiple resources 468 may include or correspond to multiple resources 410, mapping information 469 may include or correspond to mapping information 412, or a combination thereof.

Transmitter 456 is configured to transmit reference signals, synchronization signals, control information and data to one or more other devices, and receiver 458 is configured to receive reference signals, control information and data from one or more other devices. For example, transmitter 456 may transmit signaling, control information and data to, and receiver 458 may receive signaling, control information and data from, UE 115. In some implementations, transmitter 456 and receiver 458 may be integrated in one or more transceivers. Additionally or alternatively, transmitter 456 or receiver 458 may include or correspond to one or more components of base station 105 described with reference to FIG. 2.

In some implementations, base station 105 may include one or more antenna arrays. The antenna array may include multiple antenna elements configured to perform wireless communications with other devices, such as with the UE 115. In some implementations, the antenna array may be configured to perform wireless communications using different beams, also referred to as antenna beams. The beams may include TX beams and RX beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. Alternatively, one or more sets of antenna elements of the antenna array may be configured to concurrently generate multiple beams, for example using multiple RF chains of the base station 105. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

Although described as including base station 105, network may alternatively or additionally include one or more network entities. A network entity may include a base station 105, a modem, a router (e.g., a wireless router), or a combination thereof. In some implementations, a network entity may be configured to perform one or more operations described herein with reference to base station 105. Additionally, or alternatively, the network entity may be configured to communicate with base station 105.

In some implementations, wireless communications system 400 implements a 5G NR network. For example, wireless communications system 400 may include multiple 5G-capable UEs 115 and multiple 5G-capable base stations 105, such as UEs and base stations configured to operate in accordance with a 5G NR network protocol such as that defined by the 3GPP. In some other implementations, wireless communications system 400 implements a 6G network.

During operation of wireless communications system 400, base station 105 may generate configuration information 470. For example, base station 105 may generate configuration information based on grant-free information 464, such as power levels 466, resources 468, mapping information 469, or a combination thereof. In some implementations, configuration information 470 may include or indicate power levels 466, resources 468, mapping information 469, or a combination thereof. Additionally, or alternatively, configuration information 470 may indicate that a UE may perform, or base station 105 is configured for, grant-free access.

Base station 105 may transmit configuration information 470. For example, base station 105 may transmit configuration information to one or more UEs, such as UE 115, UE 415, or a combination thereof. In some implementations, configuration information 470 may be included in a system information block (SIB) or a radio resource control (RRC).

UE 115 may receive configuration information 470 and identify and/or generate grant-free information 406 based on configuration information 470. Although described as UE 115 receiving an indication of grant-free information 406 (e.g., 464) based on configuration information 470 from base station 105, in other implementations, UE 115 may already include at least a portion of grant-free information 406. For example, grant-free information 406 may be defined by a standard.

UE 115 may determine to transmit data to base station 105. UE 115 may determine one or more parameters associated with transmission of the data. For example, UE 115 may identify a transmit power level, a frequency domain resource, a time domain resource, a DMRS port, a PRACH preamble, or a combination thereof. In some implementations, UE 115 may determine at least one parameter of the one or more parameters based on grant-free message 472. UE 115 may transmit the data based on or in accordance with the one or more parameters. For example, UE 115 may transmit the data as grant-free message 472. In some implementations, grant-free message 472 may include or indicate a transmit power level, a frequency domain resource, a time domain resource, a DMRS port, a PRACH preamble, a PRACH preamble index value, or a combination thereof.

Base station 105 may receive grant-free message 472 and may decode grant-free message 472. In some implementations, base station 105 may receive at least a portion of grant-free message 472 at the same time that base station 105 receives a portion of uplink message 474 from UE 115. Base station 105 may decode grant-free message 472 and uplink message 474 based on decode logic 462. For example, base station 105 may perform successive interference cancellation to decode grant-free message 472 and uplink message 474.

In some implementations, base station 105 may assign a set of power targets, such as power levels 466 (e.g., 408) to UE 115. Base station 105 may include an indication of the set of power targets in configuration information 470, such as an RRC configuration. In some implementations, the RRC configuration may be included in a SIB. UE 115 may select (e.g., randomly select) one power level and transmit grant-free message 472 using the selected power level. In other implementations, the set of power targets (e.g., power levels 408) may be predetermined, such as defined by a standard, and stored at UE 115. It is noted that base station 105 does not need to know the exact power level selected and/or used by UE 115 to transmit grant-free message 472. It is noted that when multiple UEs are transmitting during the same PUSCH occasion, PRACH preambles mapped to the same PUSCH occasion by different UEs should be mapped to different power levels such that transmissions from the different UEs have different SINR.

In some implementations, UE 115 may determine a power level based on a random selection of a preamble, such as a preamble for a 2-step RACH. In some such implementations, UE 115 may include mapping information 412, such as a mapping of preambles, such as PRACH preambles, to power targets. Accordingly, UE 115 may randomly select a preamble and determine a target power by mapping, based on the mapping data, the preamble (e.g., a PRACH sequence index) to a power level. In some implementations, the mapping data (or an indication thereof) may be received by UE 115 from base station 105. For example, base station 105 may include an indication of power levels (e.g., 408) in configuration information 470, such as an RRC configuration. In some implementations, the RRC configuration may be included in a SIB. In some implementations, the set of power targets may be indicated by a parameter, such as a msgA-preambleReceivedTargetPower parameter. To illustrate, the parameter may include a list of target power values, such as an enumerated list, and the order of the listed target power values indicates an index value for each power value. As another example, the set of power targets may be indicated by a parameter, such as a msgA-DeltaPreamble parameter. In other implementations, the mapping data (e.g., mapping information 412) may be predetermined, such as defined by a standard, and stored at UE 115.

In some implementations, a standard may define an output power for which UE 115 is configured. For example, a standard may indicate:

$$P_{PUSCH,b,f,c}(i,\ j,\ q_d,\ l) = \min\begin{Bmatrix} P_{CMAX,f,c}(i), \\ P_{O\_PUSCH,b,f,c}(j) + 10\log_{10}\left(2^{\mu}\cdot M^{PUSCH}_{RB,b,f,c}(i)\right) + \\ \alpha_{b,f,c}(j)\cdot PL_{b,f,c}(q_d) + \Delta_{TF,b,f,c}(i) + f_{b,f,c}(i,\ l) \end{Bmatrix}[\text{dBm}],$$

where $P_{CMAX,f,c}(i)$ is the UE configured maximum output power for carrier f of serving cell c in PUSCH transmission occasion i. The $P_{CMAX,f,c}(i)$ which is the UE configured maximum output power may be defined in [8-1, TS 38.101-1], [8-2, TS38.101-2] and [8-3, TS38.101-3].

$P_{O\_PUSCH,b,f,c}(j)$ is a parameter composed of the sum of a component $P_{O\_NOMINAL,PUSCH,b,f,c}(j)$ and a component $P_{O\_UE\_PUSCH,b,f,c}(j)$ where j {0, 1, . . . , J−1}.

If a UE established dedicated RRC connection using a Type-2 random access procedure, as descried in clause 8, and is not provided P0-PUSCH-AlphaSet, or for a PUSCH transmission for Type-2 random access procedure as described in clause 8.1A, j=0, $P_{O\_UE\_PUSCH,b,f,c}(0)=0$, and PO_NOMINAL_PUSCH,f,c(0)=$P_{O\_PRE}+\Delta_{MsgA\_PUSCH}$, Where $P_{O\_PRE}$ is provided by msgA-preambleReceivedTargetPower, or by preambleReceivedTargetPower if msgA-preambleReceivedTargetPower is not provided and is provided by msgA-DeltaPramble, or $\Delta_{MsgA\_PUSCH}=\Delta_{MsgA\_PREAMBLE\_Msg3}$ dB if msgA-DeltaPreamble is not provided, for carrier f of serving cell c.

In some implementations, an RACH-ConfigGenericTwoStepRA information element, such as an information element defined in Rel. 15, Rel. 16, or a later release, may include:

```
RACH-ConfigGenericTwoStepRA-r16 ::= SEQUENCE {
  msgA-PRACH-ConfigurationIndex-r16          INTEGER (0..262)
                                             OPTIONAL, -- Cond 2StepOnly
  msgA-RO-FDM-r16                            ENUMERATED {one, two, four,
    eight}                                   OPTIONAL, -- Cond 2StepOnly
  msgA-RO-FrequencyStart-r16                 INTEGER
    (0..maxNrofPhysicalResourceBlocks-1)     OPTIONAL, -- Cond 2StepOnly
  msgA-ZeroCorrelationZoneConfig-r16         INTEGER (0..15)
                                             OPTIONAL, -- Cond 2StepOnly
  msgA-PreamblePowerRampingStep-r16          ENUMERATED {dB0, dB2, dB4,
    dB6}                                   OPTIONAL, -- Cond2StepOnlyNoCFRA
  msgA-PreambleReceivedTargetPower-r16       ENUMERATED (first value,
    second value)                              OPTIONAL, -- Cond
    2StepOnlyNoCFRA
  msgB-ResponseWindow-r16                    ENUMERATED {s11, s12, s14,
    s18, s110, s120, s140, s180, s1160, s1320}  OPTIONAL, -- Cond NoCFRA
  preambleTransMax-r16                       ENUMERATED {n3, n4, n5, n6,
    n7, n8, n10, n20, n50, n100, n200}     OPTIONAL, -- Cond 2StepOnlyNoCFRA
  ...
}
```

It is noted that for msgA-PreambleReceivedTargetPower parameter, the enumerated values of “first value” and “second value” are illustrative. The enumerated values for the msgA-PreambleReceivedTargetPower parameter may include one or more values, such as multiple values including two or more values.

In some implementations, an MsgA-PUSCH-Config information element, such as an information element defined in Rel. 15, Rel. 16, or a later release, may include:

```
MsgA-PUSCH-Config-r16 ::=                 SEQUENCE {
  msgA-PUSCH-ResourceGroupA-r16           MsgA-PUSCH-Resource-r16
    OPTIONAL, -- Cond InitialBWPConfig
  msgA-PUSCH-ResourceGroupB-r16           MsgA-PUSCH-Resource-r16
    OPTIONAL, -- Cond GroupBConfigured
  msgA-TransformPrecoder-r16              ENUMERATED {enabled, disabled}
    OPTIONAL, -- Need R
  msgA-DataScramblingIndex-r16            INTEGER (0..1023)
    OPTIONAL, -- Need S
```

-continued

```
  msgA-DeltaPreamble-r16          ENUMERATED (first value, second value)
                                OPTIONAL, -- Need R
}
```

It is noted that for msgA-DeltaPreamble parameter, the enumerated values of "first value" and "second value" are illustrative. The enumerated values for the msgA-DeltaPreamble parameter may include one or more values, such as multiple values including two or more values.

In some implementations, UE 115 may use resources 410, which may include or indicate a FD resources, TD resources, or a combination thereof. For example, resources 410 may include a pool of candidates that UE 115 can select randomly. To illustrate, base station 105 may assign, or a standard may define, a list of resources. Additionally, or alternatively, selection of one of resources 410 may be performed based on mapping information 412.

In some implementations, base station 105 may indicate resources 410 based on mapping data that includes or indicates a mapping of DMRS ports to the resource sets. The mapping data (e.g., mapping information 412, 469) may be transmitted from base station 105 to UE 115 or may be defined by a standard. UE 115 may know which DMRS port(s) it is going to use and may determine one or more of resources 410 based on the mapping data.

In some implementations, such as for a 2-step RACH, the mapping data (e.g., mapping information 412, 469) include or indicate a mapping of PRACH preambles to the resource sets. For example, a preamble index value may indicate an index value of a resource of resources 410.

In some implementations, resources 410, 468, or mapping information 412, 469, may be indicated by a parameter, such as a frequencyDomainAllocation parameter. To illustrate, the parameter may include a list of resources, such as an enumerated list, and the order of the listed resources indicates an index value for each resource.

In some implementations, an rrc-ConfiguredUplinkGrant information element, such as an information element defined in Rel. 15, Rel. 16, or a later release, may include:

```
rrc-ConfiguredUplinkGrant              SEQUENCE {
  timeDomainOffset                       INTEGER (0..5119),
  timeDomainAllocation                   INTEGER (0..15),
  frequencyDomainAllocation              ENUMERATED (first value,
    second value),
  antennaPort                            INTEGER (0..31),
  dmrs-SeqInitialization                 INTEGER (0..1)
      OPTIONAL,   -- Need R
  precodingAndNumberOfLayers             INTEGER (0..63),
  srs-ResourceIndicator                  INTEGER (0..15)
      OPTIONAL,   -- Need R
  mcsAndTBS                              INTEGER (0..31),
  frequencyHoppingOffset                 INTEGER
    (1..maxNrofPhysicalResourceBlocks-1)
      OPTIONAL,   -- Need R
  pathlossReferenceIndex                 INTEGER (0..maxNrofPUSCH-
    PathlossReferenceRSs-1),
  ...,
  [[
  pusch-RepTypeIndicator-r16             ENUMERATED {pusch-
    RepTypeA, pusch-RepTypeB}
      OPTIONAL,   -- Need M
  frequencyHoppingPUSCH-RepTypeB-r16     ENUMERATED {interRepetition,
    interSlot}
      OPTIONAL, -- Cond RepTypeB
  timeReferenceSFN-r16                   ENUMERATED {sfn512}
      OPTIONAL,   -- Need S
  ]]
}                                          OPTIONAL,   -- Need R
```

It is noted that for frequencyDomainAllocation parameter, the enumerated values of "first value" and "second value" are illustrative. The enumerated values for the frequencyDomainAllocation parameter may include one or more values, such as multiple values including two or more values. Additionally, or alternatively, the enumerated values may include bit string values. It is also noted that, additionally or alternatively, the timeDomainOffset parameter or the timeDomainAllocation parameter may include an enumerated list of values.

In some implementations, resources 410, 468, or mapping information 412, 469, may be indicated by a parameter, such as a frequencyStartMsgA-PUSCH parameter. To illustrate, the parameter may include a list of resources, such as an enumerated list, and the order of the listed resources indicates an index value for each resource.

In some implementations, an MsgA-PUSCH-Resource information element, such as an information element defined in Rel. 15, Rel. 16, or a later release, may include:

```
MsgA-PUSCH-Resource-r16 ::=            SEQUENCE {
  msgA-MCS-r16                           INTEGER (0..15),
```

-continued

```
  nrofSlotsMsgA-PUSCH-r16                        INTEGER (1..4),
  nrofMsgA-PO-PerSlot-r16                        ENUMERATED {one, two, three,
    six},
  msgA-PUSCH-TimeDomainOffset-r16                INTEGER (1..32),
  msgA-PUSCH-TimeDomainAllocation-r16            INTEGER (1..maxNrofUL-
    Allocations) OPTIONAL, -- Need S
  startSymbolAndLengthMsgA-PO-r16                INTEGER (1..127)
      OPTIONAL, -- Need S
  mappingTypeMsgA-PUSCH-r16                      ENUMERATED {typeA, typeB}
      OPTIONAL, -- Need S
  guardPeriodMsgA-PUSCH-r16                      INTEGER (0..3)
      OPTIONAL, -- Need R
  guardBandMsgA-PUSCH-r16                        INTEGER (0..1),
  frequencyStartMsgA-PUSCH-r16                   ENUMERATED (first value,
    second value),
  nrofPRBs-PerMsgA-PO-r16                        INTEGER (1..32),
  nrofMsgA-PO-FDM-r16                            ENUMERATED {one, two, four,
    eight},
  msgA-IntraSlotFrequencyHopping-r16             ENUMERATED {enabled}
      OPTIONAL, -- Need R
  msgA-HoppingBits-r16                           BIT STRING (SIZE (2))
      OPTIONAL, -- Cond FreqHopConfigured
  msgA-DMRS-Config-r16                           MsgA-DMRS-Config-r16,
  nrofDMRA-Sequences-r16                         INTEGER (1..2),
  msgA-Alpha-r16                                 ENUMERATED {alpha0, alpha04,
    alpha05, alpha06, alpha07, alpha08, alpha09, alpha1}
      OPTIONAL, -- Need S
  interlaceIndexFirstPO-MsgA-PUSCH-r16           INTEGER (1..10)
      OPTIONAL, -- Need R
  nrofInterlacesPerMsgA-PO-r16                   INTEGER (1..10)
      OPTIONAL, -- Need R
  ...
}
```

It is noted that for frequencyStartMsgA-PUSCH parameter, the enumerated values of "first value" and "second value" are illustrative. The enumerated values for the frequencyStartMsgA-PUSCH parameter may include one or more values, such as multiple values including two or more values. Additionally, or alternatively, the enumerated values may include bit string values. It is also noted that, additionally or alternatively, the msgA-PUSCH-TimeDomainOffset parameter or the msgA-PUSCH-TimeDomainAllocation parameter may include an enumerated list of values.

As described with reference to FIG. 4, the present disclosure provides techniques for power allocation or resource allocation for NOMA. For example, in some aspects, the present disclosure provides techniques for creating or having a grant-free situation in a multiple access environment where base station 105 or another network entity receives communications in which the communications have asymmetric SINR. The asymmetric SINR may enable base station 105 or the network entity to perform successive interference cancellation with respect to multiple received communications. In some other aspects, the present disclosure may enable and provide improved communications, including increased multiplexing gain and uplink cell capacity, reduced control overhead, efficient resource utilization, grant-free uplink communication, or a combination thereof. For example, in NOMA, UE 115 or 415 may perform a grant-free transmission and transmit as soon as it has a packet and without going through control signaling.

Figure 5:
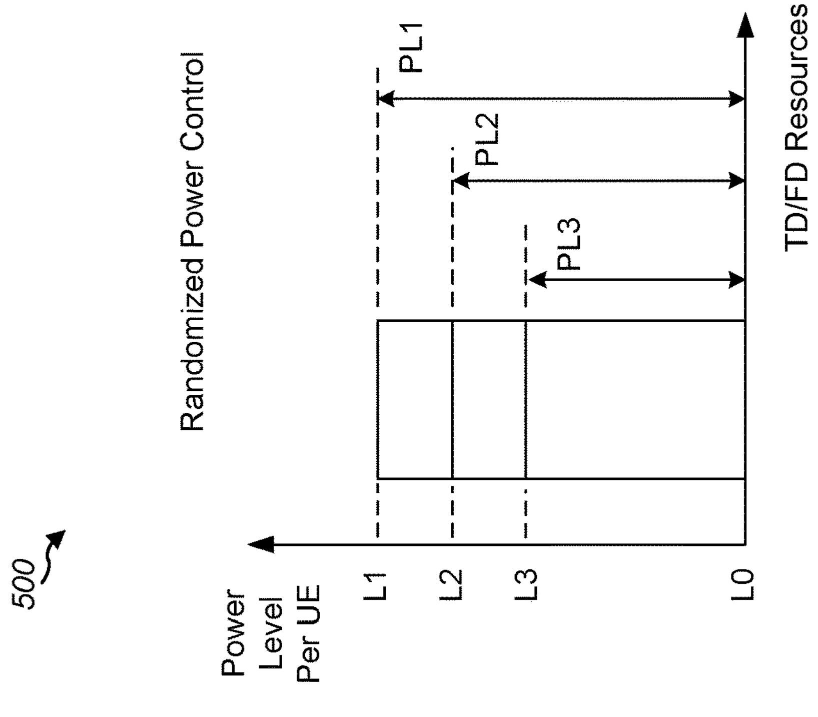
FIG. 5 is a graph showing an example of available power allocation for NOMA according to one or more aspects.

FIG. 5 is a graph showing an example of available power allocation for NOMA according to one or more aspects. For example, the graph illustrates an example of randomized power control associated with different power levels, such as power levels 408 or 466. The different power levels can be used by different UEs, such as UE 115 and UE 415. For example, different UEs may select or use different power levels.

As shown, the graph includes different power levels per UE for time domain (TD) resources or frequency domain (FD) resources. For example, the graph includes a first power level PL1, a second power level PL2, and a third power level PL3. Although three power levels are shown, other implementations may have a different number of power levels, such as one power level, two power levels, or more than three power levels.

Figure 6:
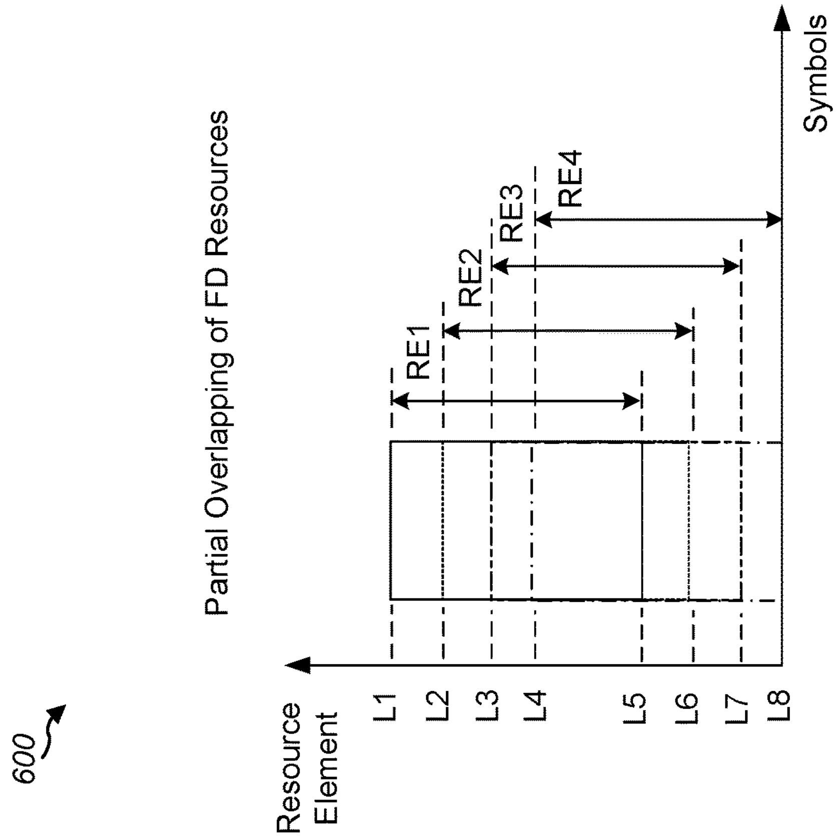
FIG. 6 is a graph showing an example of available resource allocation for NOMA according to one or more aspects.

FIG. 6 is a graph showing an example of available resource allocation for NOMA according to one or more aspects. For example, the graph illustrates an example of partial overlapping of FD resources, such as resources 410 or 468. The different FD resources can be used by different UEs, such as UE 115 and UE 415. For example, different UEs may select or use different FD resources.

As shown, the graph includes different resource elements (REs) for symbols. For example, the graph includes a first RE RE1, a second RE RE2, a third RE RE3, and a fourth RE RE4. Additionally, as shown, the first RE RE1 spans from a first frequency F1 to a second fifth frequency F5, second RE RE2 spans from a second frequency F2 to a sixth frequency F6, third RE RE3 spans from a third frequency F3 to a seventh frequency F7, and fourth RE RE4 spans from a fourth frequency F4 to an eighth frequency F8. The first RE RE1 at least partially overlaps at least one other RE—e.g., second RE2, third RE3, or fourth RE4. As shown, first RE RE1 partially overlaps each of second RE2, third RE3, and fourth RE4. In some implementations, each of first RE1, second RE2, third RE3, and fourth RE4 overlaps a portion of each of the other of first RE1, second RE2, third RE3, and fourth RE4. Although four REs are shown, other implementations may have a different number of REs, such as one RE, two REs, three REs, or more than four REs.

Figure 7:
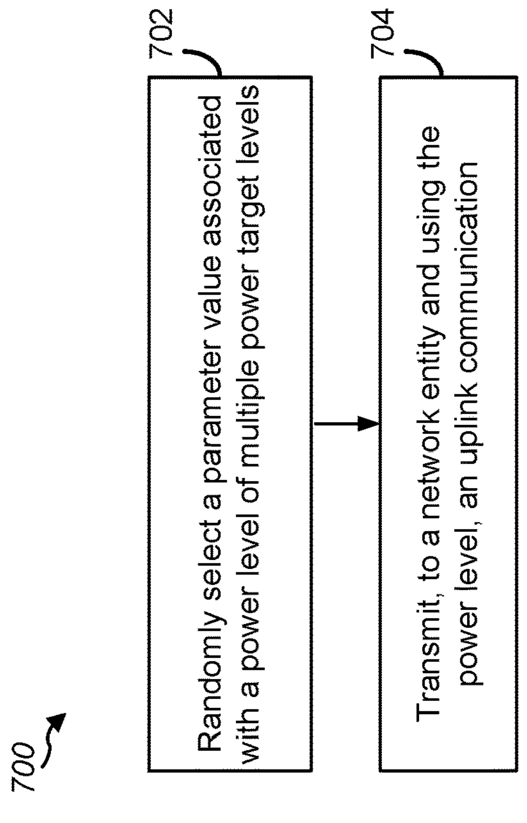
FIG. 7 is a flow diagram illustrating an example process that supports power allocation or resource allocation for NOMA according to one or more aspects.

FIG. 7 is a flow diagram illustrating an example process 700 that supports power allocation for NOMA according to one or more aspects. Operations of process 700 may be performed by a UE, such as UE 115 described above with reference to FIGS. 1-4, UE 415, or a UE described with reference to FIG. 9. For example, example operations (also referred to as "blocks") of process 700 may enable UE 115 to support power allocation for NOMA.

In block 702, the UE randomly selects a parameter value associated with a power level of multiple power target levels. The multiple power target levels may include or correspond to power levels 408, power levels 466, or power levels PL1, PL2, PL3 of FIG. 5.

In block 704, the UE transmits, to a network entity and using the power level, an uplink communication. The network entity may include or correspond to base station 105. The uplink communication may include or correspond to grant-free message 472 or uplink message 474. In some implementations, the uplink communication includes a grant-free uplink communication.

In some implementations, the UE may receive, from the network entity, a configuration that includes or indicates the multiple power target levels. For example, the configuration may include or correspond to configuration information 470. The UE may receive, from the network entity, an SIB or an RRC that includes or indicates the configuration. Additionally, or alternatively, the configuration may be predetermined, such as based on standard, and stored at the UE. In some implementations, the parameter value is the power level selected from the multiple power target level.

In some implementations, the uplink communication includes a first message (Msg-A) of a 2-step RACH. The UE may receive mapping data that maps PRACH preambles to power target levels. For example, the mapping data may include or correspond to mapping information 412 or mapping information 469. In some implementations, the mapping data may be received or indicated by an RRC received by the UE from the network entity. Additionally, or alternatively, the mapping data may be predetermined, such as based on a standard, and stored at the UE. In some implementations, the parameter value may include or be associated with a PRACH preamble. To illustrate, randomly selecting the parameter value may include randomly selecting the PRACH preamble from a set of multiple PRACH preambles. The UE may determine the power level based on the PRACH preamble and based on the mapping data. For example, the PRACH preamble may correspond to a PRACH sequence index value and the UE may determine the power level using the mapping data and based on the PRACH sequence index value. In some implementations, the uplink communication includes or indicates the PRACH sequence index value.

In some implementations, the multiple power target levels is associated with an enumerated list of the multiple power target levels that is included in or indicated by a msgA-preambleReceivedTargetPower parameter. Additionally, or alternatively, the multiple power target levels is associated with an enumerated list of the multiple power target levels that is included in or indicated by a msgA-DeltaPreamble parameter.

Figure 8:
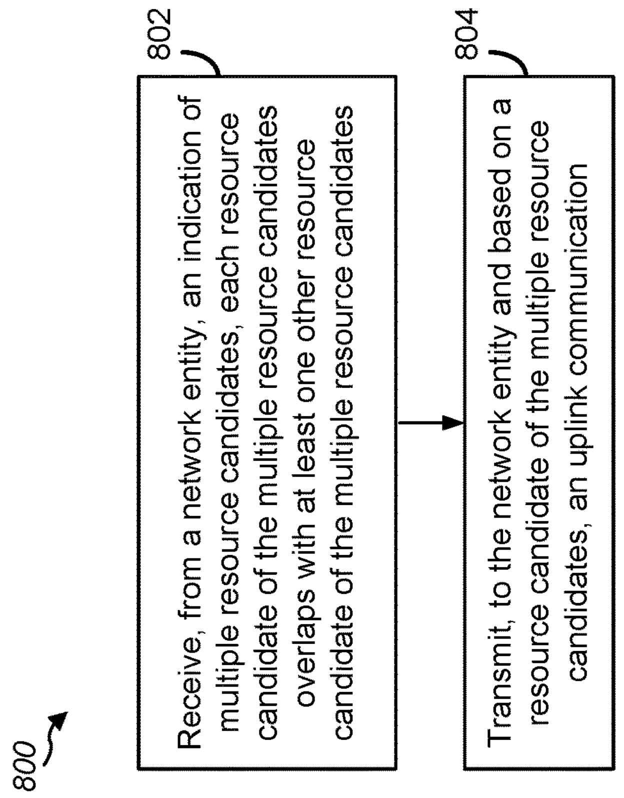
FIG. 8 is a flow diagram illustrating an example process that supports power allocation or resource allocation for NOMA according to one or more aspects.

FIG. 8 is a flow diagram illustrating an example process 800 that supports resource allocation for NOMA according to one or more aspects. Operations of process 800 may be performed by a UE, such as UE 115 described above with reference to FIGS. 1-4, UE 415, or a UE described with reference to FIG. 9. For example, example operations (also referred to as "blocks") of process 800 may enable UE 115 to support resource allocation for NOMA.

In block 802, the UE receiving, from a network entity, an indicator that indicates multiple resource candidates. The network entity may include or correspond to base station 105. The multiple resource candidates may include or correspond to resources 410, resources 468, or resources RE1, RE2, RE3, RE4 of FIG. 6. Each resource candidate of the multiple resource candidates overlaps with at least one other resource candidate of the multiple resource candidates. In some implementations, each resource candidate of the multiple resource candidates overlaps with each other resource candidate of the multiple resource candidates.

In some implementations, the indicator may be received or indicated by configuration information, such as configuration information 470. For example, the indicator may be received or indicated by an RRC received by the UE from the network entity. Additionally, or alternatively, the configuration information may be predetermined, such as based on a standard, and stored at the UE. Additionally, or alternatively, the multiple resource candidates include multiple frequency domain resource candidates or multiple time domain resource candidates. In some implementations, the multiple resource candidates include multiple frequency domain resource candidates. In other implementations, the multiple resource candidates include multiple time domain resource candidates.

In block 804, the UE transmitting, to the network entity and based on a resource candidate of the multiple resource candidates, an uplink communication. The uplink communication may include or correspond to grant-free message 472 or uplink message 474. In some implementations, the uplink communication includes a grant-free uplink communication.

In some implementations, the UE may select the resource candidate from the multiple resource candidates based on a DMRS port of the UE or based on a PRACH preamble. In some such implementations, the uplink communication may indicate the DMRS port or the PRACH preamble.

In some implementations, the indicator of the multiple resource candidates includes or indicates mapping data that maps DMRS ports to the multiple resource candidates, or that maps PRACH preambles to the multiple resource candidates. The mapping data may include or correspond to mapping information 412 or mapping information 469. In some implementations, the mapping data may be received or indicated by an RRC received by the UE from the network entity. Additionally, or alternatively, the mapping data may be predetermined, such as based on a standard, and stored at the UE.

In some implementations, the indicator of the multiple resource candidates may be associated with an enumerated list of the multiple resource candidates that is included in or indicated by a frequencyDomainAllocation parameter or a timeDomainAllocation parameter. Additionally, or alternatively, the indicator of the multiple resource candidates is associated with an enumerated list of the multiple resource candidates that is included in or indicated by a frequencyStartMsgA-PUSCH parameter or a msgA-PUSCH-TimeDomainAllocation parameter.

Figure 9:
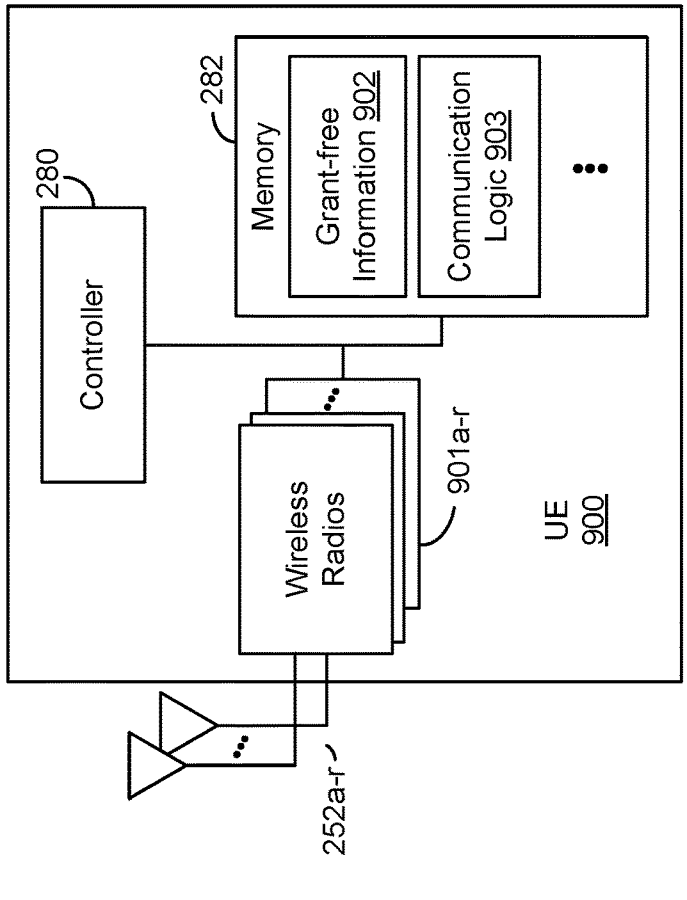
FIG. 9 is a block diagram of an example UE that supports power allocation or resource allocation for NOMA according to one or more aspects.

FIG. 9 is a block diagram of an example UE 900 that supports power allocation or resource allocation for NOMA to one or more aspects. UE 900 may be configured to perform operations, including the blocks of a process described with reference to FIGS. 7-8. In some implementations, UE 900 includes the structure, hardware, and components shown and described with reference to UE 115 of FIGS. 1-4. For example, UE 900 includes controller 280, which operates to execute logic or computer instructions stored in memory 282, as well as controlling the components of UE 900 that provide the features and functionality of UE 900. UE 900, under control of controller 280, transmits and receives signals via wireless radios 901*a-r* and antennas 252*a-r*. Wireless radios 901*a-r* include various components and hardware, as illustrated in FIG. 2 for UE 115, including modulator and demodulators 254*a-r*, MIMO detector 256, receive processor 258, transmit processor 264, and TX MIMO processor 266.

As shown, memory 282 may include grant-free information 902 and communication logic 903. Grant-free information 902 may include or correspond to grant-free information 406, such as power levels 408, resources 410, mapping information 412, or a combination thereof. Communication logic 903, such as UL communication logic, may be configured to generate one or more grant-free messages, such as grant-free message 472. The one or more grant-free messages may be generated based on grant-free information 902. UE 900 may receive signals from or transmit signals to one or more network entities, such as base station 105 of FIGS. 1-4 or a base station as illustrated in FIG. 12.

Figure 10:
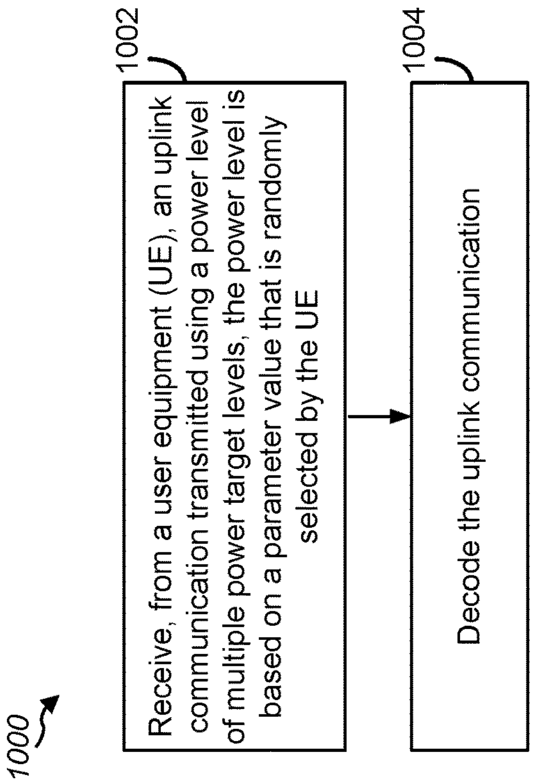
FIG. 10 is a flow diagram illustrating an example process that supports power allocation or resource allocation for NOMA according to one or more aspects.

FIG. 10 is a flow diagram illustrating an example process 1000 that supports power allocation for NOMA according to one or more aspects. Operations of process 1000 may be performed by a network entity, such as base station 105 described above with reference to FIGS. 1-4 or a base station as described above with reference to FIG. 12. For example, example operations of process 1000 may enable the network entity to support power allocation for NOMA.

At block 1002, the network entity receives, from a UE, an uplink communication transmitted using a power level of multiple power target levels. The UE may include or correspond to UE 115 or UE 415. The uplink communication may include or correspond to grant-free message 472 or uplink message 474. In some implementations, the uplink communication includes a grant-free uplink communication. The multiple power target levels may include or correspond to power levels 408, power levels 466, or power levels PL1, PL2, PL3 of FIG. 5. The power level may be based on a parameter value that is randomly selected by the UE.

At block 1004, the network entity decodes the uplink communication. In some implementations, the network entity may decode the uplink communication using a successive interference cancellation technique. To illustrate, the network entity may receive another uplink communication and may perform successive interference cancellation based on the uplink communication and the other uplink communication to decode the uplink communication and the other uplink communication.

In some implementations, the network entity transmits a configuration that includes or indicates the multiple power target levels. For example, the configuration may include or correspond to configuration information 470. The network entity may transmit an SIB or an RRC that includes or indicates the configuration. Additionally, or alternatively, the configuration may be predetermined, such as based on standard, and stored at the network entity, the UE, or both. In some implementations, the parameter value is the power level selected by the UE from the multiple power target level. Additionally, or alternatively, the network entity may indicate to the UE that the UE may perform grant-free access.

In some implementations, the uplink communication includes a first message (Msg-A) of a 2-step RACH. The network entity may transmit mapping data that maps PRACH preambles to power target levels. For example, the mapping data may include or correspond to mapping information 412 or mapping information 469. In some implementations, the mapping data may be transmitted or indicated by an RRC received to the UE from the network entity. Additionally, or alternatively, the mapping data may be predetermined, such as based on a standard, and stored at the network entity, the UE, or both. In some implementations, the parameter value may include or be associated with a PRACH preamble. To illustrate, the UE may randomly select the parameter value may by randomly selecting the PRACH preamble from a set of multiple PRACH preambles.

The UE may determine the power level based on the PRACH preamble and based on the mapping data. For example, the PRACH preamble may correspond to a PRACH sequence index value and the UE may determine the power level using the mapping data and based on the PRACH sequence index value. In some implementations, the uplink communication includes or indicates the PRACH sequence index value. The network entity may determine or identify the PRACH sequence index value and may decode the uplink communication based on the PRACH sequence index value. For example, the network entity may use the mapping data to determine the power level based on the PRACH sequence index value and may decode the uplink communication based on the power level.

In some implementations, the multiple power target levels is associated with an enumerated list of the multiple power target levels that is included in or indicated by a msgA-preambleReceivedTargetPower parameter. Additionally, or alternatively, the multiple power target levels is associated with an enumerated list of the multiple power target levels that is included in or indicated by a msgA-DeltaPreamble parameter.

FIG. 11 is a flow diagram illustrating an example process 1100 that supports resource allocation for NOMA according to one or more aspects. Operations of process 1100 may be performed by a network entity, such as base station 105 described above with reference to FIGS. 1-4 or a base station as described above with reference to FIG. 12. For example, example operations of process 1100 may enable base station 105 to support resource allocation for NOMA.

At block 1102, the network entity transmits, to a UE, an indicator of multiple resource candidates. The UE may include or correspond to UE 115 or UE 415. The multiple resource candidates may include or correspond to resources 410, resources 468, or resources RE1, RE2, RE3, RE4 of FIG. 6. Each resource candidate of the multiple resource candidates overlaps with at least one other resource candidate of the multiple resource candidates. In some implementations, each resource candidate of the multiple resource candidates overlaps with each other resource candidate of the multiple resource candidates.

In some implementations, the indicator may be received or indicated by configuration information, such as configuration information 470. For example, the indicator may be received or indicated by an RRC transmitted by the network entity and received by the UE. Additionally, or alternatively, the configuration information may be predetermined, such as based on a standard, and stored at the UE. Additionally, or alternatively, the multiple resource candidates include multiple frequency domain resource candidates or multiple time domain resource candidates. In some implementations, the multiple resource candidates include multiple frequency domain resource candidates. In other implementations, the multiple resource candidates include multiple time domain resource candidates.

At block 1104, the network entity receives, from the UE and based on a resource candidate of the multiple resource candidates determined by the UE, an uplink communication.

The uplink communication may include or correspond to grant-free message 472 or uplink message 474. In some implementations, the uplink communication includes a grant-free uplink communication. In some implementations, the UE may select the resource candidate from the multiple resource candidates based on a DMRS port of the UE or based on a PRACH preamble. In some such implementations, the uplink communication may indicate the DMRS port or the PRACH preamble.

In some implementations, the network entity may decode the uplink communication using a successive interference cancellation technique. To illustrate, the network entity may receive another uplink communication and may perform successive interference cancellation based on the uplink communication and the other uplink communication to decode the uplink communication and the other uplink communication.

In some implementations, the indicator of the multiple resource candidates includes or indicates mapping data that maps DMRS ports to the multiple resource candidates, or that maps PRACH preambles to the multiple resource candidates. The mapping data may include or correspond to mapping information 412 or mapping information 469. In some implementations, the mapping data may be received or indicated by an RRC received by the UE from the network entity. Additionally, or alternatively, the mapping data may be predetermined, such as based on a standard, and stored at the UE, the network entity, or both.

In some implementations, the indicator of the multiple resource candidates may be associated with an enumerated list of the multiple resource candidates that is included in or indicated by a frequencyDomainAllocation parameter or a timeDomainAllocation parameter. Additionally, or alternatively, the indicator of the multiple resource candidates is associated with an enumerated list of the multiple resource candidates that is included in or indicated by a frequencyStartMsgA-PUSCH parameter or a msgA-PUSCH-TimeDomainAllocation parameter.

FIG. 12 is a block diagram of an example base station 1200 that supports power allocation or resource allocation for NOMA according to one or more aspects. Although described as a base station, in other implementations, base station 1200 may include or correspond to a network entity. Base station 1200 may be configured to perform operations, including the blocks of processes described with reference to FIGS. 10-11. In some implementations, base station 1200 includes the structure, hardware, and components shown and described with reference to base station 105 of FIGS. 1-4. For example, base station 1200 may include controller 240, which operates to execute logic or computer instructions stored in memory 242, as well as controlling the components of base station 1200 that provide the features and functionality of base station 1200. Base station 1200, under control of controller 240, transmits and receives signals via wireless radios 1201*a-t* and antennas 234*a-t*. Wireless radios 1201*a-t* include various components and hardware, as illustrated in FIG. 2 for base station 105, including modulator and demodulators 232*a-t*, transmit processor 220, TX MIMO processor 230, MIMO detector 236, and receive processor 238.

As shown, the memory 242 may include grant-free information 1202 and decode logic 1203. Grant-free information 1202 may include or correspond to grant-free information 464, such as power levels 466, resources 468, mapping information 46912, or a combination thereof. Decode logic 1203 may be configured to decode one or more grant-free messages, such as grant-free message 472. The one or more grant-free messages may be decoded based on grant-free information 1202. In some implementations, decode logic 1203 may include or correspond to decode logic 462. Base station 1200 may receive signals from or transmit signals to one or more UEs, such as UE 115 of FIGS. 1-4, UE 415, or UE 900 of FIG. 9.

It is noted that one or more blocks (or operations) described with reference to FIGS. 7, 8, 10, 11 may be combined with one or more blocks (or operations) described with reference to another of the figures. For example, one or more blocks (or operations) of FIG. 7 may be combined with one or more blocks (or operations) of FIG. 8. As another example, one or more blocks associated with FIG. 10 may be combined with one or more blocks associated with FIG. 11. As another example, one or more blocks associated with FIG. 7, 8, 10, or 11 may be combined with one or more blocks (or operations) associated with FIGS. 1-4. Additionally, or alternatively, one or more operations described above with reference to FIGS. 1-4 may be combined with one or more operations described with reference to FIG. 9 or 12.

In one or more aspects, techniques for supporting power allocation or resource allocation for non-orthogonal multiple access NOMA may include additional aspects, such as any single aspect or any combination of aspects described below or in connection with one or more other processes or devices described elsewhere herein. In a first aspect, techniques for supporting power allocation or resource allocation for non-orthogonal multiple access NOMA may include randomly selecting a parameter value associated with a power level of multiple power target levels. The techniques may further include transmitting, to a network entity and using the power level, an uplink communication. In some examples, the techniques in the first aspect may be implemented in a method or process. In some other examples, the techniques of the first aspect may be implemented in a wireless communication device such as a UE, which may include a UE or a component of a UE. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include an interface (e.g., a wireless communication interface) that includes a transmitter, a receiver, or a combination thereof. Additionally, or alternatively, the wireless communication device may include one or more means configured to perform operations described herein.

In a second aspect, in combination with the first aspect, the uplink communication includes a grant-free uplink communication.

In a third aspect, in combination with the first aspect or the second aspect, the parameter value is the power level selected from the multiple power target levels.

In a fourth aspect, in combination with one or more of the first aspect through the third aspect, the techniques further include receiving, from the network entity, a configuration that includes or indicates the multiple power target levels.

In a fifth aspect, in combination with the fourth aspect, the techniques further include receiving, from the network entity, an SIB or an RRC that includes the configuration.

In a sixth aspect, in combination with the first aspect, the uplink communication includes a first message (Msg-A) of a 2-step RACH.

In a seventh aspect, in combination with the first aspect, the techniques further include receiving mapping data that maps PRACH preambles to the multiple power target levels.

In an eighth aspect, in combination with the seventh aspect, the parameter value is a PRACH preamble.

In a ninth aspect, in combination with the eighth aspect, the techniques for randomly selecting the parameter value include randomly selecting the PRACH preamble from a set of multiple PRACH preambles.

In a tenth aspect, in combination with the ninth aspect, the techniques further include determining the power level based on the PRACH preamble and based on the mapping data.

In an eleventh aspect, in combination with the tenth aspect, the PRACH preamble corresponds to a PRACH sequence index value.

In a twelfth aspect, in combination with the eleventh aspect, the uplink communication includes or indicates the PRACH sequence index value.

In a thirteenth aspect, in combination with the first aspect, the multiple power target levels is associated with an enumerated list of the multiple power target levels that is included in or indicated by a msgA-preambleReceivedTargetPower parameter or a msgA-DeltaPreamble parameter.

In one or more aspects, techniques for supporting power allocation or resource allocation for non-orthogonal multiple access NOMA may include additional aspects, such as any single aspect or any combination of aspects described below or in connection with one or more other processes or devices described elsewhere herein. In a fourteenth aspect, techniques for supporting power allocation or resource allocation for non-orthogonal multiple access NOMA may include receiving, from a network entity, an indicator that indicates multiple resource candidates, each resource candidate of the multiple resource candidates overlaps with at least one other resource candidate of the multiple resource candidates. The techniques may further include transmitting, to the network entity and based on a resource candidate of the multiple resource candidates, an uplink communication. In some examples, the techniques in the fourteenth aspect may be implemented in a method or process. In some other examples, the techniques of the first aspect may be implemented in a wireless communication device such as a UE, which may include a UE or a component of a UE. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include an interface (e.g., a wireless communication interface) that includes a transmitter, a receiver, or a combination thereof. Additionally, or alternatively, the wireless communication device may include one or more means configured to perform operations described herein.

In a fifteenth aspect, in combination with the fourteenth aspect, the uplink communication includes a grant-free uplink communication.

In a sixteenth aspect, in combination with the fourteenth aspect or the fifteenth aspect, the multiple resource candidates include multiple frequency domain resource candidates or multiple time domain resource candidates.

In a seventeenth aspect, in combination with one or more of the fourteenth aspect through the sixteenth aspect, each resource candidate of the multiple resource candidates overlaps with each other resource candidate of the multiple resource candidates.

In an eighteenth aspect, in combination with one or more of the fourteenth aspect through the seventeenth aspect, the techniques further include selecting the resource candidate from the multiple resource candidates based on a DMRS port of the UE or based on a PRACH preamble.

In a nineteenth aspect, in combination with the eighteenth aspect, the uplink communication indicates the DMRS port or the PRACH preamble.

In a twentieth aspect, in combination with the fourteenth aspect, the indicator that indicates the multiple resource candidates includes or indicates mapping data that maps DMRS ports to the multiple resource candidates.

In a twenty-first aspect, in combination with the twentieth aspect, the indicator that indicates the multiple resource candidates includes or indicates mapping data that maps PRACH preambles to the multiple resource candidates.

In a twenty-second aspect, in combination with the twenty-first aspect, the indicator that indicates the multiple resource candidates is associated with an enumerated list of the multiple resource candidates that is included in or indicated by a frequencyDomainAllocation parameter or a timeDomainAllocation parameter.

In a twenty-third aspect, in combination with the twenty-second aspect, the indicator that indicates the multiple resource candidates is associated with an enumerated list of the multiple resource candidates that is included in or indicated by a frequencyStartMsgA-PUSCH parameter or a msgA-PUSCH-TimeDomainAllocation parameter.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-12 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms “upper” and “lower” are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method comprising:

receiving mapping data that maps physical random access channel (PRACH) preambles to multiple power target levels, wherein the mapping data maps each PRACH preamble of a set of multiple PRACH preambles to a respective one of the multiple power target levels;

randomly selecting a parameter value associated with a power level of the multiple power target levels; wherein the parameter value is a PRACH preamble, and wherein randomly selecting the parameter value comprises randomly selecting the PRACH preamble from the set of multiple PRACH preambles; and transmitting, to a network entity and using the power level, an uplink communication.

2. The method of claim 1, wherein the uplink communication includes a grant-free uplink communication.

3. The method of claim 1, wherein the parameter value is the power level selected from the multiple power target levels.

4. The method of claim 1, further comprising receiving, from the network entity, a configuration that includes or indicates the multiple power target levels.

5. The method of claim 4, further comprising receiving, from the network entity, a system information block (SIB) or a radio resource control (RRC) that includes the configuration.

6. The method of claim 1, wherein the uplink communication includes a first message (Msg-A) of a 2-step random access channel (RACH).

7. The method of claim 1, further comprising:

determining the power level based on the PRACH preamble and based on the mapping data; and wherein the PRACH preamble corresponds to a PRACH sequence index value, and wherein the uplink communication includes or indicates the PRACH sequence index value.

8. The method of claim 1, wherein the multiple power target levels is associated with an enumerated list of the multiple power target levels that is included in or indicated by a msgA-preambleReceivedTargetPower parameter or a msgA-DeltaPreamble parameter.

9. A user equipment (UE) comprising:

a memory storing processor-readable code; and at least one processor coupled to the memory, the at least one processor configured to execute the processor-readable code to cause the at least one processor to:

receive mapping data that maps physical random access channel (PRACH) preambles to multiple power target levels, wherein the mapping data maps each PRACH preamble of a set of multiple PRACH preambles to a respective one of multiple power target levels;

randomly select a parameter value associated with a power level of the multiple power target levels; wherein the parameter value is a PRACH preamble; and initiate transmission of, to a network entity and using the power level, an uplink communication.

10. The UE of claim 9, wherein:

the uplink communication includes a grant-free uplink communication; and the parameter value is the power level selected from the multiple power target levels.

11. The UE of claim 9, wherein the at least one processor is further configured to execute the processor-readable code to cause the at least one processor to receive, from the network entity, a configuration that includes or indicates the multiple power target levels.

12. The UE of claim 9, wherein the uplink communication includes a first message (Msg-A) of a 2-step random access channel (RACH).

13. The UE of claim 9, wherein the at least one processor is further configured to execute the processor-readable code to cause the at least one processor to:

determine the power level based on the PRACH preamble and based on the mapping data; and wherein the PRACH preamble corresponds to a PRACH sequence index value, and wherein the uplink communication includes or indicates the PRACH sequence index value.

* * * * *